United States Patent Office 3,350,385
Patented Oct. 31, 1967

3,350,385
SYNTHESIS OF AZO COMPOUNDS BY REARRANGEMENT OF HYDRAZONES
Leonard Spialter, 2536 England Ave., Dayton, Ohio 45406, and Gerald L. Untereiner, 199 Westhaven Drive, Ottawa 3, Ontario, Canada
No Drawing. Filed Aug. 25, 1964, Ser. No. 392,376
2 Claims. (Cl. 260—192)

ABSTRACT OF THE DISCLOSURE

Isomerized azo compounds are synthesized from hydrazones by molecular rearrangement with potassium hydroxide in dry nitrogen as by dropping at 0° C. methylhydrazine into propionaldehyde with refluxing in forming propionhydrazone. The carbonyl also may be a ketone such as acetone.

---

The invention described herein may be manufactured and used by or for the United States Government for governmental purposes without the payment to either of us of any royalty thereon.

This invention relates to making azo compounds from hydrazones by molecular rearrangement, and not by oxidation or reduction reactions.

Heretofore, azo compounds commonly have been synthesized by the oxidation of hydrazine compounds or by the reduction of nitrogen compounds. An illustrative patent is numbered 3,017,406.

The objects of the present invention are to provide a new and improved synthesis of azo compounds by molecular rearrangement of relatively inexpensive reagents in a simple reaction that avoids steps of oxidation or reduction. The process is applicable to the preparation of azo compounds of almost any structure, readily, cheaply, rapidly and in good yields. The process is applicable to large scale commercial synthesis of compounds at economically feasible costs.

The azoalkanes that are disclosed herein as being illustrative of the practice of the present invention, are of use in the basic research studies of free radicals, polymerization initiators and as intermediates.

The hydrazones are chemical compounds of the general formula $$R_1R_2\!=\!N\!-\!NHR_3$$

wherein $R_1$, $R_2$ and $R_3$ are selected from the general class comprising organic alkyl groups and hydrogen atoms.

The present invention involves the rearrangement of the hydrazone molecules into their isomeric azo compounds of the general form $$R_1R_2CH\!-\!N\!=\!N\!-\!R_3$$

The rearrangement reaction is assisted by the use of catalysts, and particularly by the use of bases or alkaline substances, of which potassium hydroxide and the amino group of the initial hydrazone are illustrative. The symbols $R_1$, $R_2$ and $R_3$ indicate differing functional groups on the hydrazone molecule that prevent the reshuffling of the groups during synthesis and that preserve the molecular integrity. An atmosphere of dry nitrogen preferably is maintained throughout each synthesis, to prevent side reactions such as oxidation or hydrolysis.

The use of catalysis, particularly by bases, by an alkaline substance, such as potassium hydroxide, or by the amino group of the initial hydrazine reagent or hydrazone intermediate, is helpful and desirable.

The method used to synthesize azo compounds is illustrated by the procedure of reacting at the temperature of 0° C., methylhydrazine by its dropwise addition to a carbonyl compound, such for example, as propionaldehyde to form the corresponding hydrazone, which, on standing, develops a yellow color, with an absorption maximum at about 370 millimicrons, that is characteristic of the presence of the azo compound.

An interesting feature of this synthesis is the change in the color of the hydrazone during purification by fractional distillation. The distilled product is initially clear but after approximately 10 minutes it is observed that the color of the collected distillate is changed to a very light yellow. This color change, together with the faint characteristic sweet odor of azo compounds and the absorption band at about 370 millimicrons when they are present, indicate the possibility of self-catalysed isomerization from the hydrazone ($-\!N\!-\!N\!=$) to the corresponding azoalkane ($-\!N\!=\!N\!-$). It has been established from the synthesis of the azo compounds by the methods of this invention that the rearrangement is base catalysed and thus the basic characteristics of the hydrazones initiate partial isomerization of the hydrazone to the azoalkane.

The hydrazone so made is isolated pure by distillation and then is refluxed with dry potassium hydroxide. The end product azo compound is then distilled off from the mixture of the hydrazone with the dry potassium hydroxide and the composition of the end product is identified chemically and physically.

The successful and confirmed synthesis of azo compounds from illustrative alkyl hydrazones, have the general formula $R_a\!-\!N\!=\!N\!-\!R_b$ wherein $R_a$ is methyl and $R_b$ is n-propyl, isopropyl, n-butyl, s-butyl, and isobutyl. In each reaction, the hydrazone is prepared from methyl hydrazine of the composition $CH_3\!-\!NH\!-\!NH_2$ and the appropriate aldehyde or ketone according to the general equation:

$$CH_3\!-\!NH\!-\!NH_2 + R_a\!-\!\overset{O}{\underset{\|}{C}}\!-\!R_b \xrightarrow{0°\,C.} CH_3\!-\!NH\!-\!N\!=\!CH\!-\!R_aR_b + H_2O$$

methyl hydrazine    aldehyde or ketone    hydrazone

In the reaction $R_a$ and $R_b$ are each hydrogen or an organic alkyl group.

However, the hydrazones usable in the practice of this invention are neither limited to those prepared by this reaction nor to those bearing only alkyl substituents. The only requirement on the hydrazone is that it possess at least one hydrogen atom on the amino nitrogen.

The hydrazone is refluxed over dry potassium hydroxide pellets and the final product is collected at timed intervals by means of a distillation head. Under the influence of the base, heat, and workup of the reaction, the azo compound may be presumed to be formed according to the rearrangement:

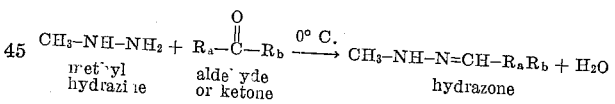

$$CH_3\!-\!NH\!-\!N\!=\!C\!-\!R_aR_b \rightleftarrows CH_3N\!=\!N\!-\!CH\!-\!R_aR_b$$
alkyl hydrazone      azo compound The existence of the hydrazone-azo pair constitutes an example of tautomerism or the coexistence of two or more compounds that differ from each other only in the position of one or more mobile atoms and in electron distribution. More specifically, their existence is explained in the prototropy class of tautomerism where interconversion is thought to occur by means of a shift of a hydrogen atom accompanied by a redistribution of electron density.

*Example I*

In the illustrative preparation of 1-propane azomethane of the composition $CH_3$—$CH_2$—$CH_2$—$N$=$N$—$CH_3$, freshly distilled hydrazone of the boiling point 124° C. is prepared under an atmosphere of dry nitrogen by reacting methylhydrazine $CH_3$—$NH$—$NH_2$ with propionaldehyde

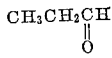

at 0° C. to produce N-methyl-N'-n-propylidene hydrazine as:

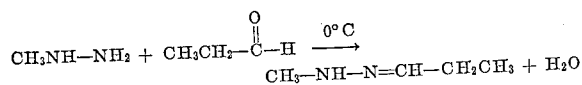

Potassium hydroxide is azeotropically dried with toluene and is crushed to a powder of a desired fineness.

Twenty grams of the freshly distilled N-methyl-N'-n-propylidene hydrazine of boiling point 124° C., are added to 6 grams of the dry powdered potassium hydroxide in a one-neck 50 milliliter flask. The flask is fitted with a 10 centimeter long fractionating column that is packed with glass helices, and that is provided with a variable take-off distillation head.

Sufficient heat is applied to the flask, from a suitable source, such as from an electrical heating mantle or the like, to cause the contents of the flask to maintain a refluxing temperature of about 60° C. under ordinary laboratory conditions. When the refluxing temperature becomes steady at 60° C., the azo product is removed by means of a stop cock in the distillation head.

The collection of the distillate is continued until a rise of two degrees in the temperature is noted, at which time the refluxing is continued. The process is repeated until the reaction is completed with no more hydrazine in the distillation flask. The process requires about 2½ hours.

The refractionation of the collected distillate illustratively yields about 65 percent of 1-propaneazomethane of a boiling point 58.5–59.5° C. at 736 mm. Hg and of the physical properties $n_D^{25}$ 1.3856 and $d_4°^{25}$ 0.7485 and of the composition $$CH_3-CH_2-CH_2-N=N-CH_3$$

The same method of preparation of hydrazones is followed in the synthesis of the alkyl hydrazones, with the exception of N-methyl-N'-isopropylidene hydrazine. This synthesis differs from the synthesis of the remaining hydrazones only in that ethanol is used as solvent, whereas no solvent is used for the synthesis of the remaining four hydrazones that are listed herein. There is no material difference in the ease of preparation, so the use of the solvent is believed to be of little significance.

Additional typical illustrative reactions appear in Table I and Table II hereinafter.

The hydrazones prepared by the reaction at 0° C. of methyl-hydrazine with acetone

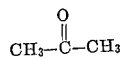

to yield N-methyl-N'-isopropylidene hydrazine of the composition $CH_3NHN=C(CH_3)_2$; n-butyraldehyde

to yield N-methyl-N'-n-butylidene hydrazine of the composition $CH_3NHN=CHCH_2CH_2CH_3$; methylethylketone or 2-butanone $CH_3COC_2H_5$ to yield N-methyl-N'-S-butylidene hydrazine; and with isobutyraldehyde

to yield N-methyl-N'-isobutylidene hydrazine of the composition $CH_3NH-N=CHCH(CH_3)_2$; etc., respectively, were isomerized to their respective azo compounds. For each synthesis approximately 20 g. of the hydrazone was added to 6 g. of dried potassium hydroxide (KOH) pellets contained in a 50 ml. flask. The flask was fitted with a 10 cm. glass-helices packed column and a small distillation head. Sufficient heat was applied with an electric Glas-Col heating mantle to cause refluxing. When the temperature became steady, the product was removed by means of a stopcock on the distilling head. Collection was continued until a two degree rise in temperature was noted, at which time refluxing was continued. The above process was repeated until the reaction was complete, i.e., no more hydrazone remained in the distilling flask.

A true boiling point for each product was established by redistillation through a 5 cm. column. To complete the identification of each compound, the density at 25° C., an 0° C., refractive index at 25° C., infrared absorption spectrum, molecular refractivity (calculated and observed), and elemental analysis were obtained.

The preparative data are summarized in Table I, characteristic physical properties appear in Table II.

In Table I the N-methyl-N'-n-propylidene hydrazine was isomerized to 1-propaneazomethane, or $$CH_3NH-N=C(CH_3)_2$$

was rearranged to $CH_3N=NCH(CH_3)_2$. The N-methyl-N'-isopropylidene hydrazine was isomerized to 2-propaneazomethane, or $CH_3NHN=C(CH_3)_2$ was rearranged to $CH_3N=N-CH(CH_3)_2$. The N-methyl-N'-n-butylidene hydrazine was isomerized to 1-butaneazomethane, or $CH_3NHN=CHCH_2CH_2CH_3$ was rearranged to $CH_3N=N(CH_2)_3CH_3$. The N-methyl-N'-S-butylidene hydrazine was isomerized to 2-butaneazomethane, or $$CH_3NHN=C(CH_3)CH_2CH_3$$

was rearranged to $$CH_3N=NCH(CH_3)CH_2CH_3$$

The N-methyl-N'-isobutylidene hydrazine was isomerized to 1-(2-methylpropane) azomethane, or $$CH_3NHN=CHCH(CH_3)_2$$

was rearranged to $CH_3N=NCHC(CH_3)_2$.

TABLE 1.—YIELDS OF UNSYMMETRICAL ALKYL AZOALKANES FROM REARRANGEMENT OF HYDRAZONES

| Starting Hydrazone | Azo Compound | Structure | Isomerization Time (hrs.) | Yield (percent) Weight |
|---|---|---|---|---|
| N-methyl-N'-n-propylidene hydrazine | 1-propaneazomethane | $CH_3N=N-CH_2CH_2CH_3$ | 2.5 | 64.8 |
| N-methyl-N'-isopropylidene hydrazine | 2-propaneazomethane | $CH_3N=N-CH(CH_3)_2$ | 6.5 | 59.7 |
| N-methyl-N'-n-butylidene hydrazine | 1-butaneazomethane | $CH_3N=N-(CH_2)_3-CH_3$ | 3.0 | 63.9 |
| N-methyl-N'-s-butylidene hydrazine | 2-butaneazomethane | $CH_3N=N-CH(CH_3)CH_2CH_3$ | 16.0 | 42.7 |
| N-methyl-N'-isobutylidene hydrazine | 1-(2-methylpropane)-azomethane | $CH_3N=N-CHC(CH_3)_2$ | 4.0 | 65.4 |

TABLE II.—PHYSICAL PROPERTIES OF UNSYMMETRICAL ALKYL AZOALKANES

| Compound | Boiling Point (° C.) | Pressure (mm. Hg) | Refractive Index ($n_D^{25}$) | Density (g./ml.) | | Molecular Refractivity at 25° C. | |
|---|---|---|---|---|---|---|---|
| | | | | 25° C. | 0° C. | Calc. | Obs. |
| 1-propaneazomethane | 58.5–59.5 | 736 | 1.3856 | 0.7485 | 0.7782 | 27.05 | 27.01 |
| 2-propane-azomethane | 48.5–49.5 | 744 | 1.3782 | 0.7327 | 0.7605 | 27.05 | 27.11 |
| 1-butane-azomethane | 89–90 | 734 | 1.3974 | 0.7674 | 0.7917 | 31.67 | 31.46 |
| 2-butane-azomethane | 77.5–78 | 740 | 1.3926 | 0.7560 | 0.7813 | 31.67 | 31.60 |
| 1-(2-methylpropane)-azomethane | 79.0–79.5 | 739 | 1.3918 | 0.7543 | 0.7798 | 31.67 | 31.62 |

It is to be understood that the synthesis of azo compounds that is disclosed herein is illustrative of an experimentally confirmed series of reactions and results, and that modifications and limited changes may be made therein without departing from the scope of the present invention defined by the appended claims.

We claim:

1. The synthesis of an azo compound by the rearrangement of a hydrazone of the formula

wherein $R_a$ and $R_b$ are hydrogen or an alkyl group containing 1 to 4 carbon atoms consisting of the steps of refluxing the hydrazone under a dry nitrogen atmosphere over dry potassium hydroxide and thereafter collecting the final product by distillation.

2. The process of preparing 1-propaneazomethane of the composition

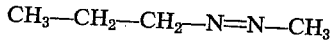

comprising the steps of reacting about 20 grams of N-methyl-N′-n-propylidene hydrazine with six grams of dry powdered potassium hydroxide in a flask fitted with a fractionating column packed with glass helices and provided with a variable take-off distillation head, heating the flask to a refluxing temperature of about 60° C., removing the 1-propaneazomethane product by means of a stop cock in the distillation head collecting the distillate until a rise of two degrees in the temperature is noted at which time the refluxing is continued, and repeating the process until the reaction is completed.

References Cited

Chattaway et al.: J. Chem. Soc. (London), vol. of 1930, pp. 843–850.

Gershinowitz et al: J. Chem. Phys., vol. 2, pp. 273–282 (1934).

Ramsperger: J. Am. Chem. Soc., vol. 51, pp. 918–921 (1929).

CHARLES B. PARKER, *Primary Examiner.*

F. D. HIGEL, *Assistant Examiner.*